(12) United States Patent
Liao et al.

(10) Patent No.: US 11,811,709 B2
(45) Date of Patent: Nov. 7, 2023

(54) METHOD AND SYSTEM FOR RECOMMENDING CONTENT USING CHATBOT

(71) Applicant: LINE CORPORATION, Tokyo (JP)

(72) Inventors: Li-Wen Liao, Tokyo (JP); Yun-Ru Sun, Tokyo (JP); Chan-Yuan Chang, Tokyo (JP); Jun-Wei Wan, Tokyo (JP)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 17/510,886

(22) Filed: Oct. 26, 2021

(65) Prior Publication Data
US 2022/0150190 A1  May 12, 2022

(30) Foreign Application Priority Data
Nov. 6, 2020 (KR) .......... 10-2020-0147290

(51) Int. Cl.
*H04L 51/02* (2022.01)
*G06F 3/0482* (2013.01)
*H04L 51/18* (2022.01)

(52) U.S. Cl.
CPC ............ *H04L 51/02* (2013.01); *G06F 3/0482* (2013.01); *H04L 51/18* (2013.01)

(58) Field of Classification Search
CPC ......... H04L 51/02; H04L 51/18; H04L 51/10; H04L 51/046; G06F 3/0482; G06F 16/9535; G06F 16/3329; G06F 16/9537; G06F 40/35; G06Q 50/30; G06Q 50/10
See application file for complete search history.

(56) References Cited

U.S. PATENT DOCUMENTS

| | | | |
|---|---|---|---|
| 2017/0250930 A1* | 8/2017 | Ben-Itzhak | G06F 3/0488 |
| 2018/0293983 A1* | 10/2018 | Choi | G10L 15/1815 |
| 2019/0089655 A1* | 3/2019 | Uppala | H04L 51/02 |
| 2019/0267001 A1* | 8/2019 | Byun | G10L 15/18 |

FOREIGN PATENT DOCUMENTS

KR  10-2015-0024465 A  3/2015

OTHER PUBLICATIONS

Lee, Joyce, Sejal Popat, and Soravis Prakkamakul. "Exploring the "Magic" of Algorithmic Predictions with Technology-Mediated Tarot Card Readings." (2019). (Year: 2019).*
https://www.indiegogo.com/projects/divinuet-a-musical-tarot-reading-game#/ (Aug. 12, 2020) (Year: 2020).*

* cited by examiner

*Primary Examiner* — Soe Hlaing
(74) *Attorney, Agent, or Firm* — Sughrue Mion, PLLC

(57) ABSTRACT

A method and system for recommending content using a chatbot are provided. The content recommendation method includes calling a chatbot to a chatroom based on a first user interaction with the chatroom; providing first content corresponding to a second user interaction with the chatroom while the chatbot is in the chatroom; and recommending second content related to the first content.

19 Claims, 10 Drawing Sheets

METHOD AND SYSTEM FOR RECOMMENDING CONTENT USING CHATBOT

CROSS-REFERENCE TO RELATED APPLICATION

This application claims priority to Korean Patent Application No. 10-2020-0147290, filed Nov. 6, 2020 in the Korean Intellectual Property Office, the disclosure of which is incorporated by reference herein in its entirety.

BACKGROUND

1. Field

Apparatuses, systems, and methods according to example embodiments relate to technology for recommending content.

2. Description of Related Art

In the recent times, with the increasing availability of a communication network such as the Internet, a service capable of recommending content based on an interest or a location of a user is being provided.

As a data communication-based interactive service increases, the service is expanding to a service that provides user customized content by applying needs of a user through a return channel beyond a level of providing the same content to all the users.

SUMMARY

One or more example embodiments may recommend customized content according to a current situation of a user using a chatbot as a two-way communication channel.

Further, one or more example embodiments may recommend additional content based on content provided to a user through a two-way interaction with a chatbot.

Further still, one or more example embodiments may recommend content through a chatbot by automatically triggering the chatbot based on a chat analysis result of a user.

According to an aspect of an example embodiment, a content recommendation method includes: calling a chatbot to a chatroom based on a first user interaction with the chatroom; providing first content corresponding to a second user interaction with the chatroom while the chatbot is in the chatroom; and recommending second content related to the first content.

The first user interaction may include any one or any combination of an input of a keyword for triggering the chatbot or a menu selection in the chatroom.

The content recommendation method may further include: analyzing content or a pattern of a message in the chatroom; and identifying the first user interaction based on a result of the analyzing.

The second user interaction may indicate selection of a tarot card through an interactive message in the chatroom from the chatbot, the interactive message may include first user interface elements for selection of a specific tarot card from among a plurality of tarot cards as the selected tarot card, and a second user interface element for random selection of the selected tarot card, and the providing the first content may include providing fortune information based on the selected tarot card.

The recommending may include identifying music based on the fortune information and providing the identified music as the second content.

The recommending may include: calling another chatbot linked with the chatbot to the chatroom; and identifying the second content related to the first content based on information received from the other chatbot.

The calling of the other chatbot may include selecting the other chatbot from among a plurality of chatbots.

The calling of the other chatbot may include selecting the other chatbot from among a plurality of chatbots based on any one or any combination of a type of the first content, information included in the first content, a chatbot popularity, and information related to a user.

The content recommendation method may further include: providing an evaluation user interface; and providing user feedback information corresponding to the second content to the other chatbot based on interactions with the evaluation user interface.

The user feedback information may be used to obtain a popularity ranking of the second content or a matching score between the first content and the second content.

According to an aspect of an example embodiment, there is provided a non-transitory computer-readable record medium storing instructions that, when executed by a processor, cause the processor to control a content recommendation method, the content recommendation method including: calling a chatbot to a chatroom based on a first user interaction with the chatroom; providing first content corresponding to a second user interaction with the chatroom while the chatbot is in the chatroom; and recommending second content related to the first content.

According to an aspect of an example embodiment, there is provided a computer apparatus including: at least one memory configured to store computer-readable instructions; and at least one processor configured to execute the computer-readable instructions to: call a chatbot to a chatroom based on a first user interaction with the chatroom; provide first content corresponding to a second user interaction with the chatroom while the chatbot is in the chatroom; and recommend second content related to the first content.

The first user interaction may include any one or any combination of an input of a keyword for triggering the chatbot or a menu selection in the chatroom.

The at least one processor may be further configured to: analyze content or a pattern of a message in the chatroom; and identify the first user interaction based on a result of the analyzing.

The second user interaction may indicate selection of a tarot card through an interactive message in the chatroom from the chatbot, the interactive message may include first user interface elements for selection of a specific tarot card from among a plurality of tarot cards as the selected tarot card, and a second user interface element for random selection of the selected tarot card, and the at least one processor may be further configured to provide fortune information based on a selected tarot card as the first content.

The at least one processor may be further configured to identify music based on the fortune information and provide the identified music as the second content.

The at least one processor may be further configured to call another chatbot linked with the chatbot to the chatroom; and identify the second content related to the first content based on information received from the other chatbot.

The at least one processor may be further configured to select the other chatbot from among a plurality of chatbots linkable with the chatbot.

The at least one processor may be further configured to select the other chatbot from among a plurality of chatbots based on any one or any combination of a type of the first content, information included in the first content, a chatbot popularity, and information related to a user.

The at least one processor may be further configured to: provide an evaluation user interface; and provide user feedback information corresponding to the second content to the other chatbot based on interactions with the evaluation user interface, and the user feedback information may be used to calculate a popularity ranking of the second content or a matching score between the first content and the second content.

BRIEF DESCRIPTION OF THE FIGURES

The above and/or other aspects will be more apparent by describing certain example embodiments, with reference to the accompanying drawings, in which.

DETAILED DESCRIPTION

Figure 1:
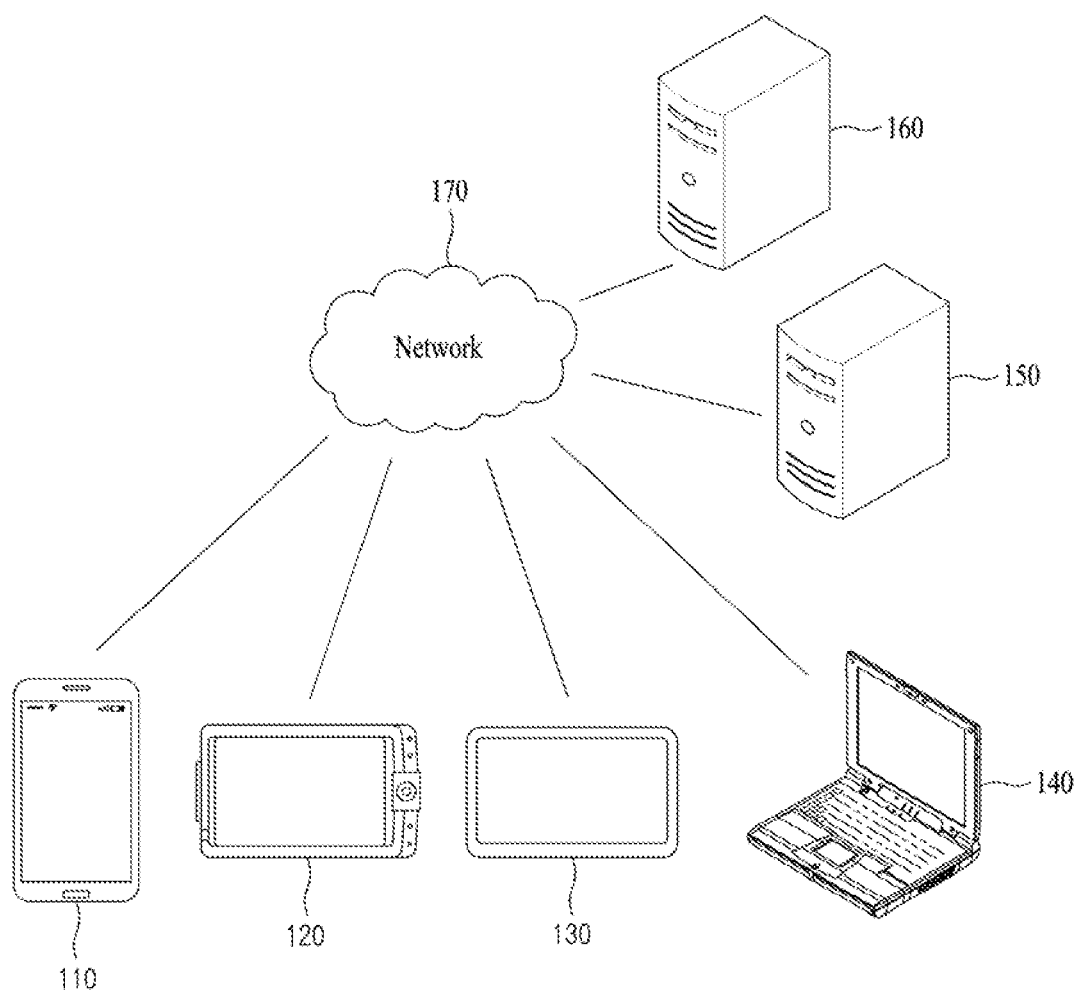
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for recommending content through a chatbot by allowing the chatbot to participate in a chatroom.

The example embodiments including the disclosures described herein may recommend content based on a situation of a user using a chatbot in a chatroom.

A content recommendation system according to the example embodiments may be implemented by at least one computer apparatus, and a content recommendation method according to the example embodiments may be performed through at least one computer apparatus included in the content recommendation system. Here, a computer program according to an example embodiment may be installed and run on the computer apparatus. The computer apparatus may perform the content recommendation method according to the example embodiments under control of the executed computer program. The computer program may be stored in a non-transitory computer-readable record medium to computer-implement the content recommendation method in conjunction with the computer program.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments. The environments applicable to the example embodiments are not limited to the network environment of FIG. 1.

Each of the plurality of electronic devices 110, 120, 130, and 140 may be a fixed or stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include a messenger service, a content providing service, a search service, a social network service, a map service, a translation service, and a financial service.

Figure 2:
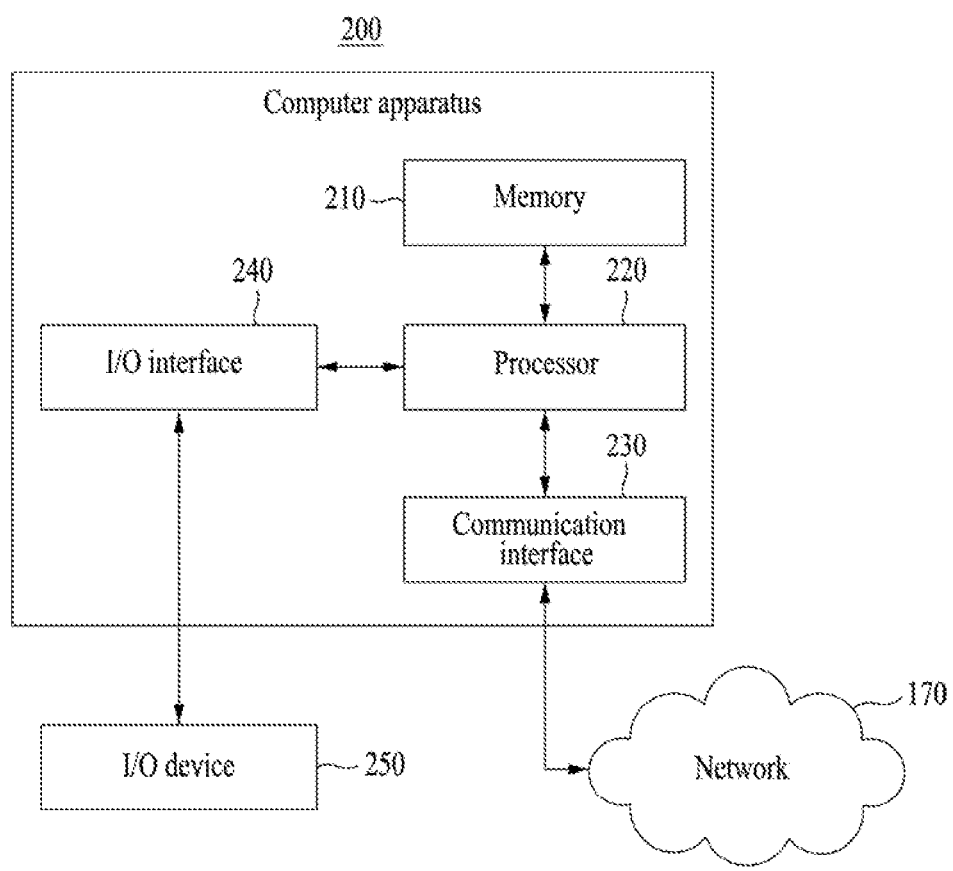
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by the computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as a ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, content, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used to interface with an I/O apparatus 250. For example, an input device may include a device, such as a microphone, a keyboard, a mouse, etc., and an output device may include a device, such as a display, a speaker, etc. As another example, the I/O interface 240 may be a device to interface with an apparatus in which an input function and an output function are integrated into a single component, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB).

Hereinafter, example embodiments of a method and system for recommending content using a chatbot are described.

Figure 3:
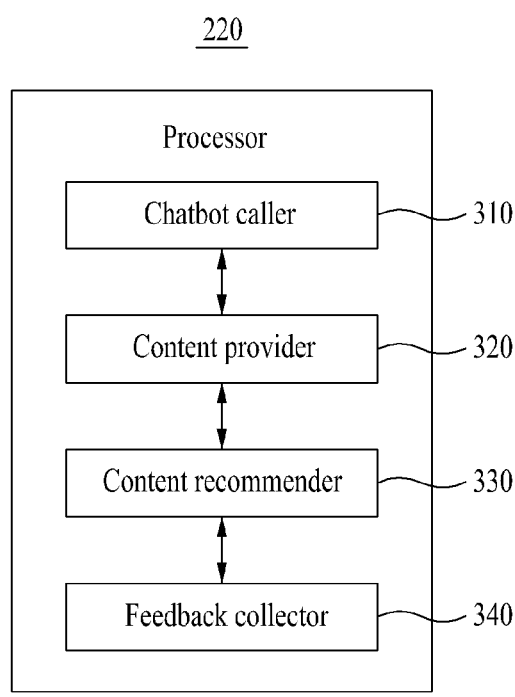
FIG. 3 is a diagram illustrating an example of components of a processor of a computer apparatus according to at least one example embodiment.
Figure 4:
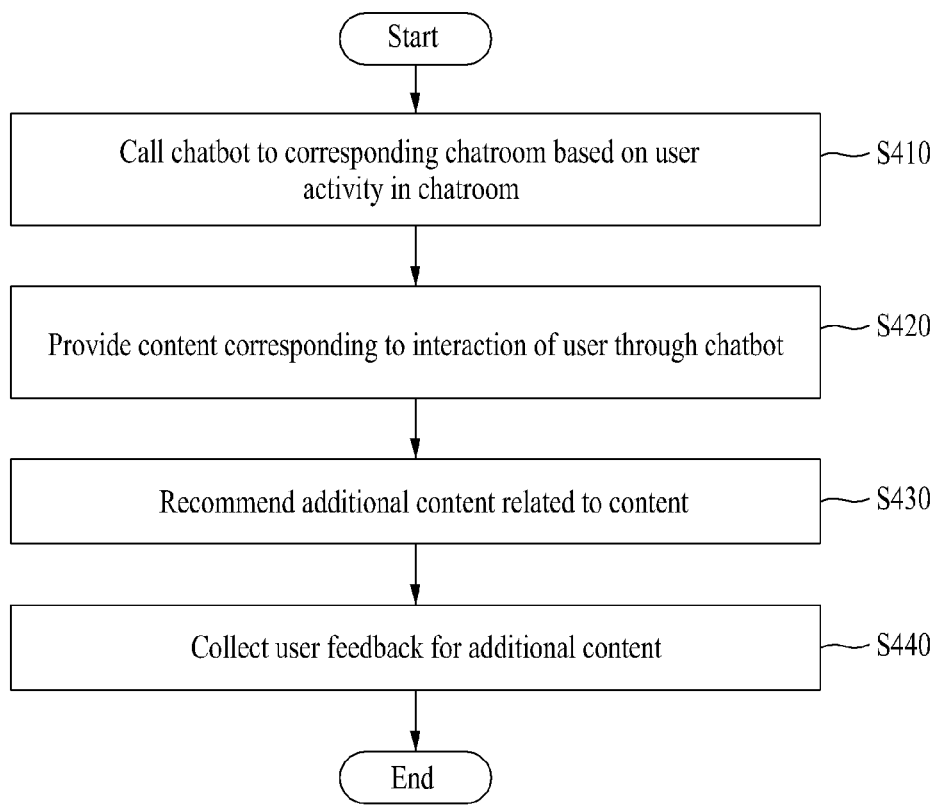
FIG. 4 is a flowchart illustrating an example of a method performed by a computer apparatus according to at least one example embodiment.

FIG. 3 is a diagram illustrating an example of components of a processor of a computer apparatus according to at least one example embodiment, and FIG. 4 is a flowchart illustrating an example of a method performed by a computer apparatus according to at least one example embodiment.

The computer apparatus 200 according to the example embodiment may provide a client with a content recommendation service through connection to a dedicated application installed on the client or a website/mobile site related to the computer apparatus 200. A computer-implemented content recommendation system may be configured in the computer apparatus 200.

Referring to FIG. 3, to perform the content recommendation method of FIG. 4, the processor 220 of the computer apparatus 200 may include a chatbot caller 310, a content provider 320, a content recommender 330, and a feedback collector 340. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer apparatus 200 to perform operations S410 to S440 included in the content recommendation method of FIG. 4. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from the program code stored in the computer apparatus 200. For example, the chatbot caller 310 may be used as a functional representation of the processor 220 that controls the computer apparatus 200 to call a chatbot to a chatroom in response to the instruction.

The processor 220 may read instructions from the memory 210 to control the computer apparatus 200. The processor 220 may execute the instructions to perform the content recommendation method disclosed herein.

FIG. 4 is a flowchart illustrating an example of a method performed by a computer apparatus according to at least one example embodiment.

Operations S410 to S440 may be performed in order different from order of FIG. 4, and a portion of operations S410 to S440 may be omitted or an additional process may be further included.

Referring to FIG. 4, in operation S410, the chatbot caller 310 may call a chatbot to a corresponding chatroom based on an activity of a user in a chatroom. For example, the chatbot may be provided by an official account of a content recommendation system. The official account refers to an account in a form of a bot that provides various types of services or contents on a messenger. In an example embodiment, the official account may be configured as a two-way channel communicable with the user. The chatbot may refer to a chat robot program that is configured to communicate with the user using a text or a voice through the messenger. A message of the chatbot may be determined through interfacing with the computer apparatus 200 or another computer apparatus that is electrically connected to the computer apparatus 200. The message of the chatbot may be determined based on a set response rule or using a neural network that is trained through machine learning. When a user activity that meets a condition set as a chatbot call event is detected in the chatroom, the chatbot caller 310 may call the chatbot in the corresponding chatroom. For example, when a keyword for triggering a chatbot is input by the user in the chatroom, the chatbot caller 310 may call the chatbot and may allow the chatbot to participate in the chatroom. As another example, when a rich menu (e.g., a menu feature displayed at the bottom of a chat screen) related to the official account of the content recommendation system is selected from the user as a menu in the chatroom, the chatbot caller 310 may call a chatbot of the corresponding account and may allow the chatbot to participate in the chatroom. As another example, the chatbot caller 310 may call a chatbot based on a result of analyzing a chat message input by the user in the chatroom and may allow the chatbot to participate in the corresponding chatroom. For example, when content or a pattern of a message written by the user includes a negative type of emotion, such as sadness or dislike, as a result of analyzing the content or the pattern of the message, the chatbot caller 310 may automatically trigger a chatbot to participate in a corresponding chatroom. Alternatively, when a specific pattern is detected, such as when a new conversation starts or when a conversation starts with a specific topic, such as a dream, the chatbot caller 310 may automatically trigger a chatbot to participate in a corresponding chatroom.

In operation S420, the content provider 320 may provide content corresponding to an interaction of the user through the chatroom. For example, the chatbot caller 310 may allow a bot of an official account that provides fortune information using tarot cards based on a user activity in the chatroom to participate in the corresponding chatroom. Therefore, the content provider 320 may provide a tarot service through a chatbot message configured to make a two-way interaction with the user. The content provider 320 may provide fortune information of the user according to a card directly selected from the user through an interface included in the chatbot message or a card randomly selected in response to a request from the user. Therefore, the content provider 320 may provide interactive content to the user using the chatbot message.

In operation S430, the content recommender 330 may recommend additional content based on the content that corresponds to the interaction of the user. The content recommender 330 may provide the additional content to the user in relation to the content primarily provided in operation S420. A bot that provides primary content and a bot that provides additional content may be bots of the same official account or bots of different official accounts that are linked together. For example, the content recommender 330 may recommend music that matches fortune information of the user through a bot of a different official account linkable with the chatbot that provides the fortune information. When the primary content provided to the user includes a message of bad luck, a music recommendation chatbot may recommend music for comforting the user. In addition to music, the content recommender 330 may provide movie, a book, content, a service, and a promotion recommendable for a current situation of the user as additional content. The content recommender 330 may recommend content that matches information included in the primary content and a content recommendation logic may use content metadata and also use a variety of information matchable between contents.

In operation S440, the feedback collector 340 may collect feedback input by the user as a reaction of the user to the additional content. The feedback collector 340 may provide a user feedback request as an interactive chatbot message at a point in time of providing the additional content and may collect user feedback, for example, like, dislike, etc., based on interactions with the interactive chatbot message.

The user feedback may be collected as a user reaction to the additional content or may be collected as a user reaction to a content set that includes the primary content and the additional content. The user feedback may be applied to the content recommendation logic. For example, the user feedback may be used to calculate a popularity ranking of the additional content or a matching score between the primary content and the additional content.

The example embodiments may provide content suitable for a current situation of the user using a chatbot capable of communicating with the user.

Hereinafter, example embodiments are described with reference to a chatbot that provides fortune information using tarot cards (hereinafter, referred to as a tarot chatbot) as an example.

Figure 5:
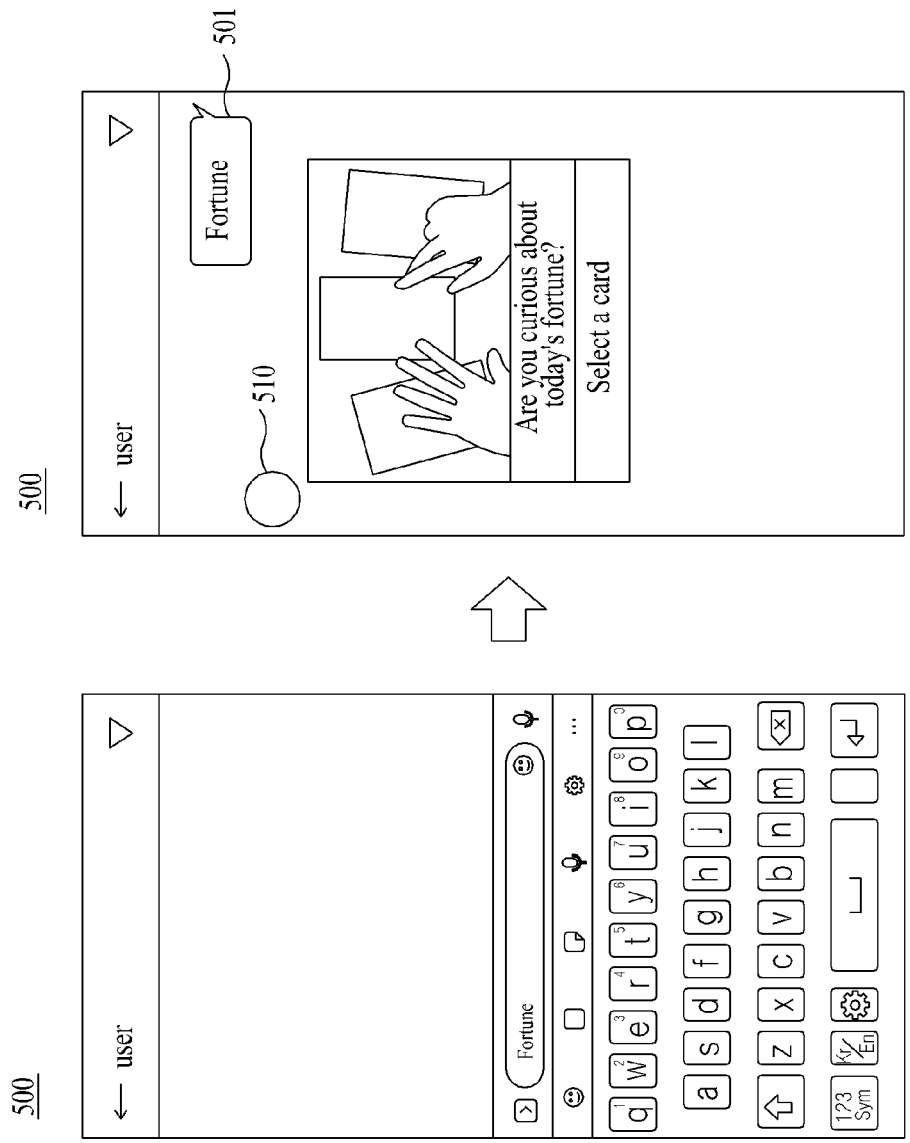
FIGS. 5 and 6 illustrate examples of a process of calling a chatbot according to at least one example embodiment.
Figure 6:
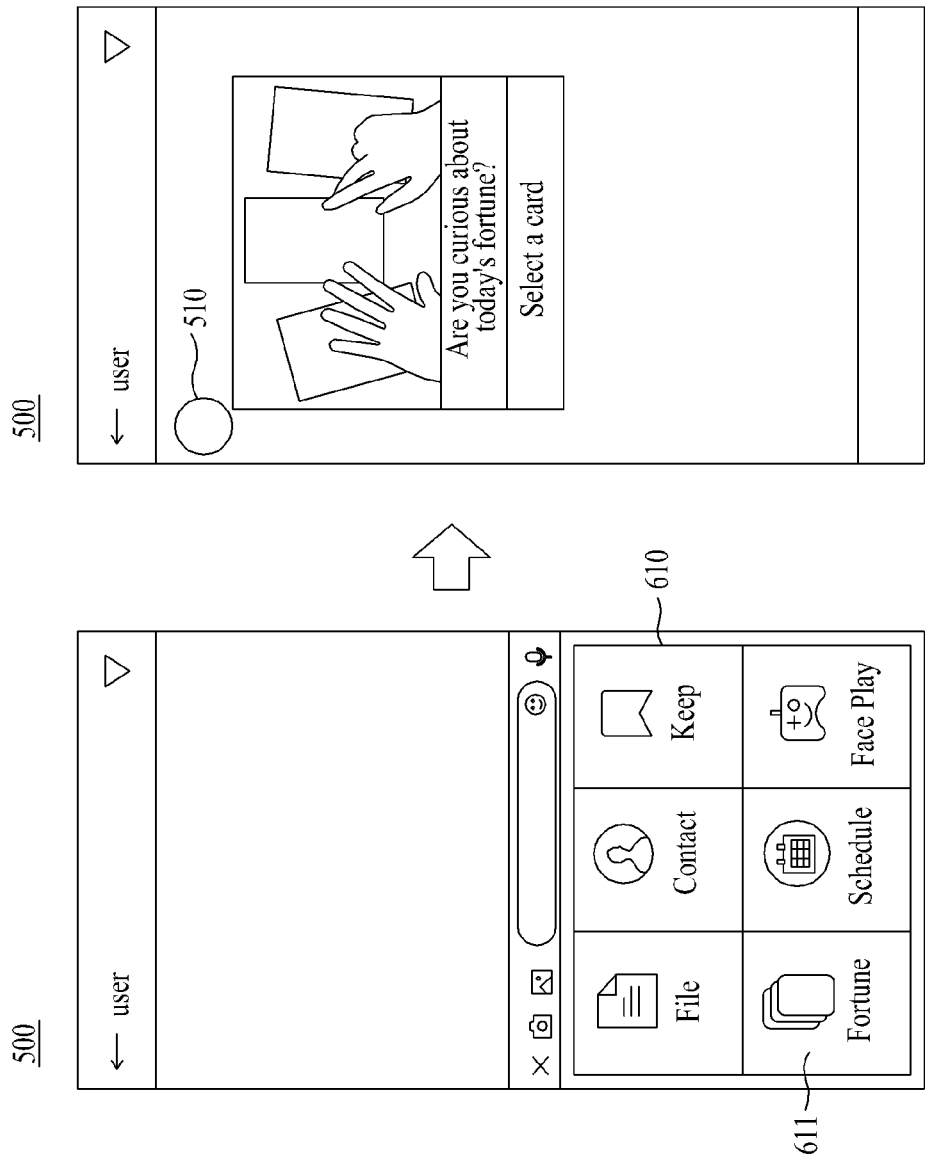

FIGS. 5 and 6 illustrate examples of a process of calling a chatbot according to at least one example embodiment. FIGS. 5 and 6 illustrate examples of a chatroom screen in which a user participates.

Referring to FIG. 5, when a keyword for triggering a chatbot is included in a chat message 501 input by a user in a chatroom 500, the processor 220 may automatically call a tarot chatbot 510 and may allow the tarot chatbot 510 to participate in the chatroom 500. When the user directly inputs the keyword for triggering a chatbot, for example, "fortune" or "tarot," in the chatroom 500, the processor 220 may invite the tarot chatbot 510 and may allow the tarot chatbot 510 to participate in the chatroom 500.

As another example, referring to FIG. 6, rich menu 610 may be displayed at the bottom of the chatroom screen, and when the user selects a menu 611 of the rich menu 610, the processor 220 may call the tarot chatbot 510 to participate in the chatroom 500.

In addition to a scheme of calling the tarot chatbot 510 using the keyword for triggering a chatbot or the menu 611, a scheme of analyzing a chat message of the user in the chatroom 500 and automatically calling the tarot chatbot 510 as a chat analysis result may also be implemented.

When conversation of the user reveals a specific type of emotion or a field of interest (e.g., an emotion or field of interest that is related to interpretation of dream or prediction) as a result of analyzing content or a pattern of a message written by the user in the chatroom 500, the processor 220 may automatically call the tarot chatbot 510 to participate in the chatroom 500.

A message provided through the tarot chatbot 510, that is, a chatbot message may be configured as an interactive message, and may include a title, description, element list, and button elements for the user to interact with the message.

FIGS. 7 to 10 illustrate examples of describing a process of providing content through a chatbot according to at least one example embodiment.

Figure 7:
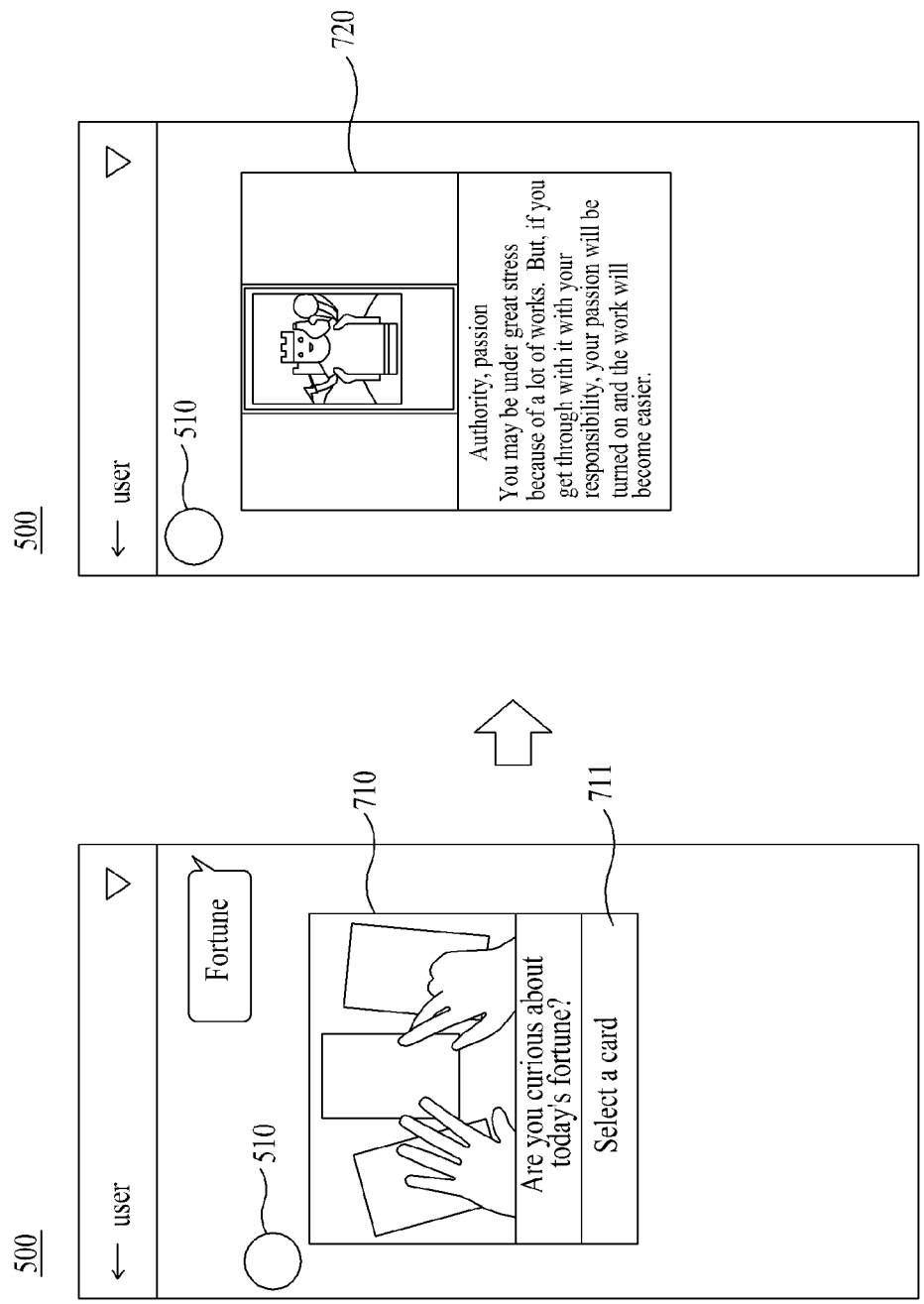
FIGS. 7 to 10 illustrate examples of describing a process of providing content through a chatbot according to at least one example embodiment.

Referring to FIG. 7, the processor 220 may provide a chatbot message 710 that includes a "Select a card" user interface (UI) 711 for allowing the tarot chatbot 510 to participate in the chatroom 500 and then selecting a tarot card through the tarot chatbot 510.

The processor 220 may provide an interface for the user to directly select a tarot card through the chatbot message 710 or an interface for randomly selecting a tarot card in response to a user request.

The processor 220 may provide content 720 corresponding to an interaction of the user using the "Select a card" UI 711 through the tarot chatbot 510. Here, in the content 720, information acquired by interpreting meaning of the tarot card selected through the interaction of the user may be configured as fortune information of the user.

Figure 8:
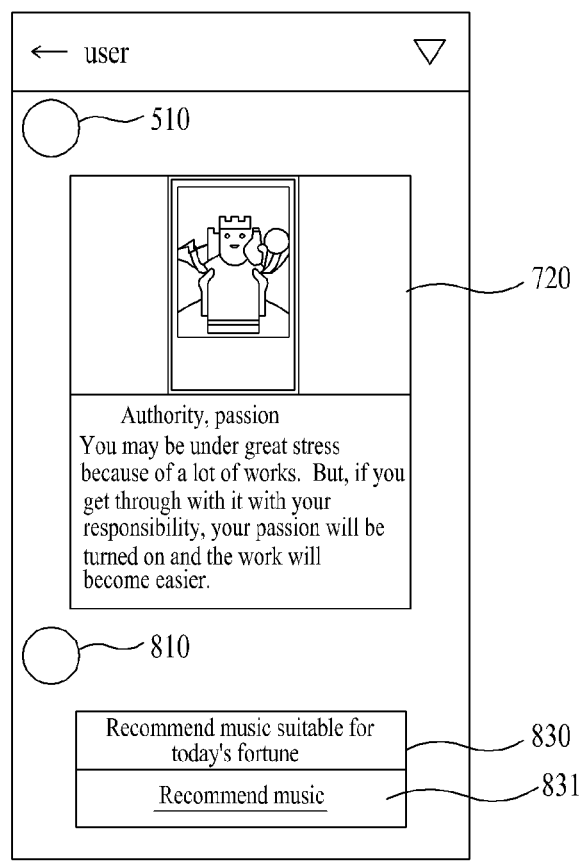

Referring to FIG. 8, the processor 220 may provide the content 720 corresponding to the interaction of the user through the tarot chatbot 510 and then may automatically call a chatbot of a different official account linked with the tarot chatbot 510, for example, a music chatbot 810 to participate in the chatroom 500.

To provide music as an example of additional content related to the content 720, the processor 220 may allow the music chatbot 810 to participate in the chatroom 500. The processor 220 may allow the music chatbot 810 to participate in the chatroom 500 and then provide a chatbot message 830 that includes a "Recommend music" UI 831 for requesting music recommendation through the music chatbot 810.

Figure 9:
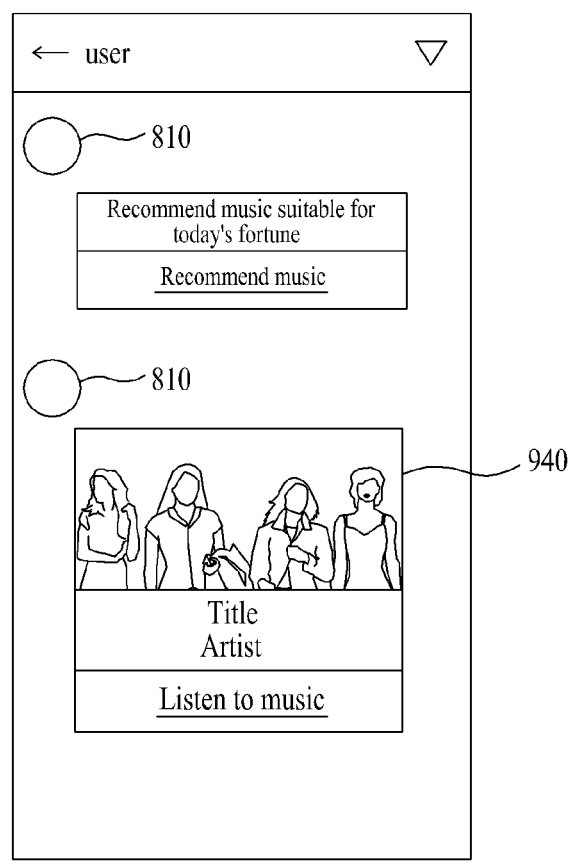

Referring to FIG. 9, when the user requests music recommendation using the "Recommend music" UI 831, the processor 220 may provide music content 940 as additional content related to the content 720. Here, the processor 220 may recommend music content 940 that matches the content 720 in association with the content 720 that is provided as fortune information of the user. Here, the matching music content 940 may be predetermined based on the content 720 that is provided as the fortune information. Also, the music content 940 may be determined based on user information, such as, for example, user profile information (e.g., an age, an area, etc.), user interest information, user preference information, and user history information, with the content 720 provided as the fortune information. For example, the processor 220 may provide the content 720 and the user information to the music chatbot 810, the music chatbot 810 may identify the matching music content 940 based on the received content 720 and user information, and the processor 220 may receive the matching music content 940 from the music chatbot 810.

The processor 220 may collect evaluation information input by the user as user feedback on the music content 940 that is provided as the additional content in association with the content 720.

Figure 10:
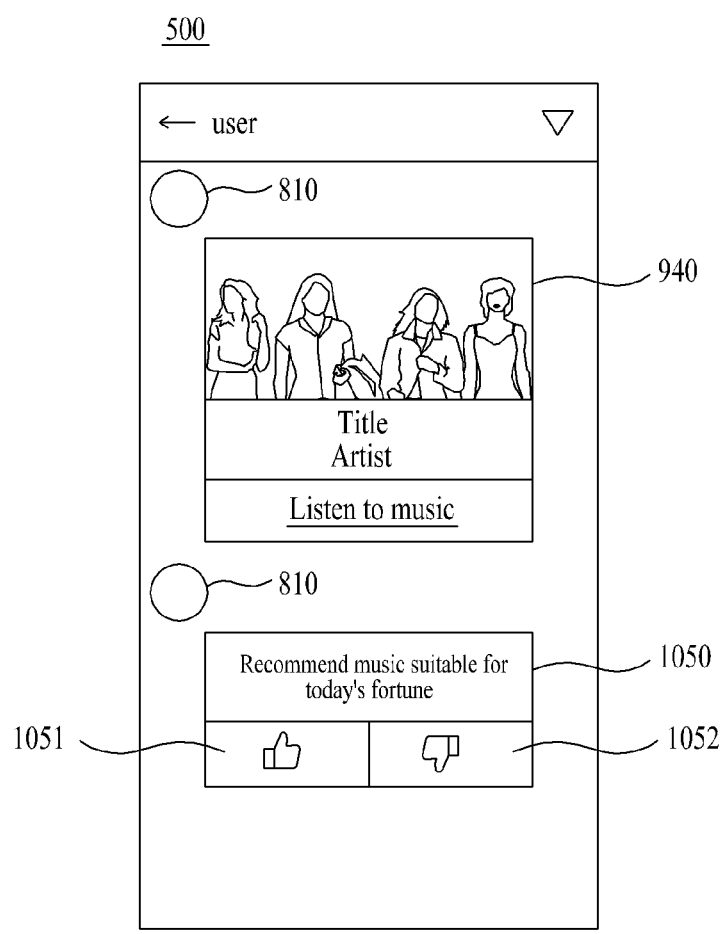

Referring to FIG. 10, the processor 220 may configure, as a chatbot message 1050 of the music chatbot 810, an evaluation UI for providing the music content 940 that matches the content 720 through the music chatbot 810 and then receiving a user reaction on the music content 940 as feedback and may provide the evaluation UI.

For example, referring to FIG. 10, the evaluation UI may include a button 1051 for inputting a positive evaluation and a button 1052 for inputting a negative evaluation. Additionally, a list of recommended music contents may be updated by including a "Recommend other music" UI and a user reaction may be indirectly fed back. User feedback received as above may be subsequently used to recommend music content to the user and/or another user.

The processor 220 may provide fortune information of the user as primary content through the tarot chatbot 510 and may recommend music content that matches the fortune information of the user by additionally linking the music chatbot 810.

Although an example of recommending music based on fortune information of the user in association with the tarot chatbot 510 and the music chatbot 810 is described, it is provided as an example only.

The processor 220 may recommend a variety of contents, such as music, books, lottery tickets, and games, as additional content and may automatically select a chatbot based on a type of primary content, information included in the primary content, a chatbot popularity, user information (e.g., a profile and an interest), and the like.

The processor 220 may use a single chatbot as a chatbot for recommending additional content. Depending on example embodiments, at least one chatbot among a plurality of chatbots may be used. For example, the music chatbot 810, a movie chatbot, and a game chatbot may be provided in association with the tarot chatbot 510.

The processor 220 may associate a different chatbot for each user for the tarot chatbot 510. If a different chatbot links with the tarot chatbot 510 for each user, recommendation content that matches the fortune information and is additionally provided may differ.

A chatbot for recommending the additional content may be set as a chatbot directly selected by the user in addition to an automatic selection scheme. According to an example embodiment, when primary content is provided through the tarot chatbot 510, a chatbot list including a plurality of chatbots linkable with the tarot chatbot 510 may be provided. At least one chatbot (e.g., a music chatbot and a movie chatbot) may be linked in response to a selection from the user on the provided chatbot list and recommendation content (e.g., recommendation music and movie) may be provided based on the primary content (e.g., fortune information).

According to example embodiments, it is possible to recommend customized content according to a current situation of a user using a chatbot as a two-way communication channel. Also, according to example embodiments, it is possible to provide primary content to a user through a two-way interaction with a chatbot and to recommend additional content that matches the primary content in association with the primary content.

The apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are provided as examples and are not to be construed as limiting. The present teaching can be readily applied to other types of apparatuses. Also, the description is intended to be illustrative, and not to limit the scope of the claims, and many alternatives, modifications, and variations will be apparent to those skilled in the art.

What is claimed is:
1. A content recommendation method comprising:
  calling a first chatbot to a chatroom based on a first user interaction with the chatroom;
  providing a first content corresponding to a first type of content based on a second user interaction indicating selection of a first selectable user interface element provided in a first interactive message received from the first chatbot in the chatroom while the first chatbot is in the chatroom;

calling a second chatbot to the chatroom which provides a second type of content that is different from the first type;

displaying a second interactive message from the second chatbot in the chatroom identifying a recommended content corresponding to the first content and comprising a second selectable user interface element, wherein the recommended content comprises audio, and the second interactive message identifies a title and an artist of the audio; and providing the recommended content as second content based on a third user interaction indicating selection of the second selectable user interface element, wherein the providing the recommended content comprises reproducing the audio, wherein the first selectable user interface element is one from among first card selection user interface elements for selection of a specific card from among a plurality of cards as a selected card, and a second card selection user interface element for random selection of the selected card, and wherein the first content is identified based on the selected card.

2. The content recommendation method of claim 1, wherein the first user interaction comprises any one or any combination of an input of a keyword for triggering the first chatbot or a menu selection in the chatroom.

3. The content recommendation method of claim 1, further comprising:

analyzing content or a pattern of a message in the chatroom; and identifying the first user interaction based on a result of the analyzing.

4. The content recommendation method of claim 1, wherein the specific card is a tarot card and the plurality of cards comprises a plurality of tarot cards, and wherein the providing the first content comprises providing fortune information based on the tarot card.

5. The content recommendation method of claim 4, wherein the audio comprises music, wherein the title and the artist correspond to the music, wherein the music is identified based on the fortune information, and wherein the content recommendation method further comprises providing the identified music as the second content based on the third user interaction with the second interactive message.

6. The content recommendation method of claim 1, wherein the calling of the second chatbot comprises selecting the second chatbot from among a plurality of chatbots.

7. The content recommendation method of claim 1, wherein the calling of the second chatbot comprises selecting the second chatbot from among a plurality of chatbots based on any one or any combination of the first type of content, information included in the first content, a chatbot popularity, and information related to a user.

8. The content recommendation method of claim 1, further comprising:

providing an evaluation user interface; and providing user feedback information corresponding to the recommended content to the second chatbot based on interactions with the evaluation user interface.

9. The content recommendation method of claim 8, wherein the user feedback information is used to obtain a popularity ranking of the recommended content or a matching score between the first content and the recommended content.

10. The content recommendation method of claim 1, wherein the title and the artist are identified based on the first content, and wherein the content recommendation method further comprises providing the recommended content as the second content based on the third user interaction with the second interactive message.

11. A non-transitory computer-readable record medium storing instructions that, when executed by a processor, cause the processor to control a content recommendation method, the content recommendation method comprising:

calling a first chatbot to a chatroom based on a first user interaction with the chatroom;

providing a first content corresponding to a first type of content based on a second user interaction indicating selection of a first selectable user interface element provided in a first interactive message received from the first chatbot in the chatroom while the first chatbot is in the chatroom;

calling a second chatbot to the chatroom which provides a second type of content that is different from the first type;

displaying a second interactive message from the second chatbot in the chatroom identifying a recommended content corresponding to the first content and comprising a second selectable user interface element, wherein the recommended content comprises audio, and the second interactive message identifies a title and an artist of the audio; and providing the recommended content as second content based on a third user interaction indicating selection of the second selectable user interface element, wherein the providing the recommended content comprises reproducing the audio, wherein the first selectable user interface element is one from among first card selection user interface elements for selection of a specific card from among a plurality of cards as a selected card, and a second card selection user interface element for random selection of the selected card, and wherein the first content is identified based on the selected card.

12. A computer apparatus comprising:

at least one memory configured to store computer-readable instructions; and at least one processor configured to execute the computer-readable instructions to:

call a first chatbot to a chatroom based on a first user interaction with the chatroom;

provide a first content corresponding to a first type of content based on a second user interaction indicating selection of a first selectable user interface element provided in a first interactive message received from the first chatbot in the chatroom while the first chatbot is in the chatroom;

call a second chatbot to the chatroom which provides a second type of content that is different from the first type;

display a second interactive message from the second chatbot in the chatroom identifying a recommended content corresponding to the first content and comprising a second selectable user interface element, wherein the recommended content comprises audio, and the second interactive message identifies a title and an artist of the audio; and provide the recommended content as second content based on a third user interaction indicating selection of the second selectable user interface element, wherein the providing the recommended content comprises reproducing the audio, wherein the first selectable user interface element is one from among first card selection user interface elements for selection of a specific card from among a plurality of cards as a selected card, and a second card selection user interface element for random selection of the selected card, and wherein the first content is identified based on the selected card.

13. The computer apparatus of claim 12, wherein the first user interaction comprises any one or any combination of an input of a keyword for triggering the first chatbot or a menu selection in the chatroom.

14. The computer apparatus of claim 12, wherein the at least one processor is further configured to:

analyze content or a pattern of a message in the chatroom; and identify the first user interaction based on a result of the analyzing.

15. The computer apparatus of claim 12, wherein the first the specific card is a tarot card and the plurality of cards comprises a plurality of tarot cards, and wherein the at least one processor is further configured to provide fortune information based on the tarot card as the first content.

16. The computer apparatus of claim 15, wherein the audio comprises music, wherein the title and the artist correspond to the music, wherein the music is identified based on the fortune information, and wherein the at least one processor is further configured to provide the identified music as the second content.

17. The computer apparatus of claim 12, wherein the at least one processor is further configured to select the second chatbot from among a plurality of chatbots linkable with the first chatbot.

18. The computer apparatus of claim 12, wherein the at least one processor is further configured to select the second chatbot from among a plurality of chatbots based on any one or any combination of the first type of content, information included in the first content, a chatbot popularity, and information related to a user.

19. The computer apparatus of claim 12, wherein the at least one processor is further configured to:

provide an evaluation user interface; and provide user feedback information corresponding to the recommended content to the second chatbot based on interactions with the evaluation user interface, and wherein the user feedback information is used to calculate a popularity ranking of the recommended content or a matching score between the first content and the recommended content.

* * * * *